Patented June 27, 1939

2,163,720

UNITED STATES PATENT OFFICE 2,163,720

PREPARATION OF ACETYLENIC ALCOHOLS

Thomas H. Vaughn, Niagara Falls, N. Y., assignor to Union Carbide and Carbon Research Laboratories, Inc., a corporation of New York No Drawing. Application July 20, 1937,
Serial No. 154,564

18 Claims. (Cl. 260—617)

This invention relates to the production of acetylenic alcohols; and more particularly it concerns the production of 1,4-acetylenic glycols and corresponding alkynyl carbinols from acetylene and ketones, employing alkali metal hydroxides as reaction promoters.

Acetylenic alcohols in general are extremely valuable as starting materials in organic syntheses. Processes already are known for the production of acetylenic alcohols, involving the necessary preparation of certain intermedate compounds which are difficult or costly to prepare, such as sodium-acetone, sodium acetylide, acetylene Grignard reagent, sodium amide, and various alcoholates such as sodium ethylate and potassium t-amylate. The condensing agents employed in these known processes not only are costly but, furthermore, are destroyed in the process and do not appear in the final product. In the preparation of the alkylates or alcoholates, it is necessary to use metallic potassium or sodium to secure a suitably active product, or else to employ expensive solvents.

The present invention is based in important part upon the discovery that acetylenic alcohols may be prepared in satisfactory yields in a relatively simple manner by reacting a saturated ketone with an alkali metal hydroxide such as potassium or sodium hydroxide, followed by a treatment of the resultant reaction mixture with acetylene, the various steps being conducted under certain controlled conditions hereinafter described. The said hydroxide reacts with the ketone, yielding a complex addition product whose probable structure is indicated by

wherein R and R' may be the same or different organic radicals; and M designates an alkali metal.

Upon treating this intermediate product with acetylene under certain regulated conditions there is produced a salt of a tertiary acetylenic alcohol having the general structure

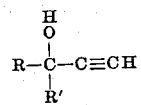

In addition thereto, there also is formed in amounts dependent upon the conditions of the acetylene treatment a salt of a 1,4-acetylenic glycol of the general structure

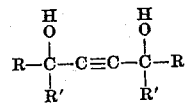

These compounds upon hydrolysis are convertible to the corresponding acetylenic alcohol and glycol.

In its broadest scope the invention involves reacting a saturated aliphatic ketone with an alkali metal hydroxide in solid form, and one preferably containing not more than around 10% of moisture. This reaction is conducted at temperatures ranging from −30° C. to the boiling point of the ketone, and preferably those in the range between 0° and 10° C. A substantial excess of the ketone over that required to react with the said hydroxide is employed, or, in place of any portion of such excess of the ketone, it is possible to employ a volatile inert solvent for the reactants, such as isopropyl or ethyl ether.

The reaction mixture from the ketone-alkali metal hydroxide treatment then is reacted with acetylene, as by passing the latter through a body of the said reaction mixture at temperatures below 60° C. and desirably within the range of 0° to 10° C.; and under pressures which may range from around atmospheric pressure to pressures as high as 200 pounds per square inch. By such temperature control it is possible to inhibit or prevent conversion of the ketone to undesired condensation products not convertible to acetylenic alcohols by the process. Preferably the reaction is conducted at temperatures around 6° C., and under pressures of from 50 to 100 pounds per square inch.

When the absorption of acetylene is complete, the reaction mixture is hydrolyzed by the addition of water, whereupon the mixture separates into two layers, the lower one of which consists of an aqueous solution of the alkali metal hydroxide, which may be removed and concentrated for recovery of the hydroxide. The upper layer is slightly acidified with a weak organic acid such as acetic acid for the purpose of neutralizing any of the aqueous caustic solution of the lower layer that may become entrained therein and which otherwise would cause decomposition of the acetylenic carbinol during distillation. With thorough separation of the two phases from the hydrolysis, practically no acid is required. This upper layer then is distilled under suitable pressure such as atmospheric pressure, for removing unreacted acetone. The residue then is fractionated under vacuum to recover the acetylenic alcohols and certain other products formed concurrently with the acetylenic alcohols from the ketone. Certain condensation products—such as diacetone alcohol, produced when acetone is used as starting material—are not objectionable and may be used in place of the ketone as the starting material. Other products that are of an unsaturated nature, such as mesityl oxide and isophorone, are not convertible to acetylenic alcohols in the process and are isolated during the distillation step.

In the practice of the invention it is preferred to utilize potassium hydroxide for treatment of the ketone. Anhydrous potassium hydroxide, and hydroxides analyzing 96 or more percent of potassium hydroxide, have been found particularly efficacious in the process. Such hydroxides grind very readily to form particles of 5 microns and less in size, and are used in this finely-divided form. While the presence of substantial amounts of water in the ketone does not prevent operation of the process, it is preferable to use the ordinary technical acetone of commerce, containing around 0.3% of water.

The following examples serve to illustrate various modifications of the invention:

Example 1

Three liters of acetone in a 10-liter steel autoclave were cooled to 6° C. Thereafter 435 grams of powdered 96% KOH was added during 55 minutes, while maintaining the temperature of the mixture at 6° C. ±0.25° C. A red-brown color formed in the solution due to a reaction with atmospheric oxygen. This can be prevented by conducting the reaction in an atmosphere of nitrogen.

The autoclave thereafter was closed and evacuated. Acetylene then was introduced into the autoclave until a pressure of 50 pounds per square inch gauge was produced, while maintaining the reaction mixture at a temperature of around 6° C., the pressure being built up as rapidly as possible while still maintaining this temperature control. The acetylene absorption was complete after 80 minutes. Ten cubic feet of acetylene, equivalent to 12.6 mols had reacted. The autoclave pressure was then released to atmospheric, and the solidified mixture was hydrolyzed with 1 liter of water while still cooling in an ice bath. The resultant liquid separated into two layers, the lower one consisting of an aqueous solution of potassium hydroxide containing substantially all of the latter that was originally employed. The upper layer, which contained the organic products of the reaction together with acetone, was acidified with 45 cc. of glacial acetic acid, and was fractionated at atmospheric pressure to a temperature of 90° C. The pressure thereafter was progressively lowered during distillation. The fraction boiling between 110° and 122° C. under an absolute pressure of 25 mm. of mercury deposited a considerable quantity of acetylene pinacol, 2,5-dimethyl-2,5-dihydroxy-hexyne-3, in the form of pure crystals. After several fractionations of the reaction products, a yield of dimethylethynylcarbinol boiling at 102–106° C. of over 70% of the theoretical and a yield of acetylene pinacol of around 12% were secured, based upon acetylene reacted, together with substantial amounts of acetone, diacetone alcohol, mesityl oxide, isophorone, xylitones and a small amount of a non-distillable residue. Since the autoclave and metering system permits a loss of 15% of acetylene under the conditions of this example, it will be seen that almost theoretical yields of the combined acetylenic alcohols were secured.

Example 2

Following the general procedure described in Example 1, 300 grams of finely-ground commercial 90% potassium hydroxide were slowly added to 1 liter of acetone and reacted therewith while maintaining a reaction temperature of 10° C. The resultant mixture thereafter was reacted with 1.7 cubic feet of acetylene under atmospheric pressure and at a temperature of 6° C. The resultant reaction mixture was hydrolyzed with 400 cc. of water; and the upper liquid layer thus produced was distilled in the manner described in Example 1. A combined yield of dimethylethynylcarbinol and acetylene pinacol of between 90% and 100% was secured, based on acetylene reacted.

Example 3

Five hundred cc. of acetone were dissolved in 1200 cc. of isopropyl ether and then reacted with 322 grams of 90% potassium hydroxide while maintaining a temperature of 10° C. Acetylene was then passed into this mixture and .75 cubic feet thereof were absorbed under atmospheric pressure and at a temperature of 6° C. The resultant reaction mixture was hydrolyzed by 400 cc. of water; and the upper layer of the stratified mixture was slightly acidified with acetic acid and distilled under the general conditions described in Example 1. A combined yield of dimethylethynylcarbinol and acetylene pinacol of between 90% and 100% was secured, based on acetylene reacted, the yield of the pinacol being around twice that of the carbinol.

Example 4

Under the general conditions described in Example 1, 3 liters of acetone, cooled to 15° C. were reacted with 440 grams of finely-ground commercial sodium hydroxide, gradually added thereto while maintaining the said temperature. Acetylene then was passed into the resultant mixture, while maintaining the latter at around 6° C. and under a pressure of 50 pounds per square inch gauge, until 3.2 cubic feet of acetylene were absorbed. The resultant mixture was hydrolyzed by introduction of 1 liter of water, thereby effecting a stratification into two liquid layers. The upper layer was slightly acidified and fractionally distilled under the general conditions described in Example 1, giving a yield of dimethylethynylcarbinol between 50% and 60%, based upon the acetylene reacted. Substantial amounts of diacetone alcohol were produced, together with some mesityl oxide and isophorone.

Example 5

Following the procedure described in Example 1, 3 liters of acetone were cooled to 6° C. and reacted with 450 grams of finely-ground 96% potassium hydroxide slowly added thereto while maintaining the said temperature. The resultant reaction mass then was treated with acetylene, while maintaining the mixture at a temperature within the range of from around 4° to around 8° C. and under a gauge pressure of 100 pounds per square inch. 5.2 cubic feet of acetylene were absorbed. The mixture was then hydrolyzed by the addition of 1 liter of water, while maintaining the last-named temperature. The upper layer of the thus-stratified reaction mixture was separated from the other layer, acidified, and fractionally distilled under the conditions described in Example 1, giving a yield of dimethylethynylcarbinol of around 98%, based upon the acetylene reacted.

Example 6

Following the general procedure recited in Example 1, 3 liters of acetone were cooled to 0° C. and treated with 600 grams of finely-divided 90% potassium hydroxide gradually added thereto while maintaining that temperature. Acetylene was then passed into the reaction mixture, 7.2 cubic feet being absorbed, while maintaining the mixture at this temperature, under a gauge pressure of 50 pounds per square inch. The resultant reaction mixture then was hydrolyzed by the introduction of water, and the upper layer of the stratified mixture was separated, acidified and fractionally distilled in the manner recited in Example 1. A yield of around 88% of dimethylethynylcarbinol thus was secured.

In the recovery of the components of the reaction mixtures of the foregoing examples it is important that vacuum distillation be employed for the primary separation of the acetylenic alcohols from the other products. If distillation at atmospheric pressure is attempted, considerable of the acetylenic alcohols are decomposed into the ketone and acetylene. However, after the crude acetylenic alcohol is separated from the other products, the former may be refractionated at atmospheric pressure without decomposition, and such separation is generally preferred.

Small amounts of water are present in the acidified upper layer of the stratified mixture from the hydrolysis step. The presence thereof renders fractionation difficult, due to the formation by dimethylethynylcarbinol and water of an azeotrope boiling at approximately 89° to 90° C.—and the formation of dimethylethynylcarbinol, mesityl oxide and water of a ternary azeotrope boiling at around 90° to 91° C. The dimethylethynylcarbinol-water azeotrope contains approximately 65% of the carbinol. It has a density of 0.906 at 21° C., and an index of refraction at the same temperature of 1.4043. This azeotrope is homogeneous in the liquid phase due to the mutual solubility of its components. Suitable means may be employed for the removal of this water either prior to or during the fractionation of this upper layer. Preferably the same is treated with solid fused calcium chloride or with a saturated aqueous solution thereof. The water then separates as a lower layer and is readily removed, as by decantation.

In the practice of the invention yields of acetylenic alcohols have been secured in excess of those theoretically possible on the assumption of the use of 1 mol of potassium hydroxide for each mol of acetylenic carbinol and glycol produced. Thus, in Example 1, a ratio by weight of dimethylethynylcarbinol to potassium hydroxide of over 1.5 was obtained, although a value no higher than 1.5 would be expected for this ratio based on the assumption that one molecular equivalent of the hydroxide is necessary for the production of one molecular equivalent of the said carbinol. This is good evidence of a true catalytic action by the alkali which accounts at least in part for the good yields of acetylenic alcohols secured.

Other saturated aliphatic ketones besides acetone may be employed in the process. Unsaturated ketones such as mesityl oxide and isophorone, however, do not react under the conditions herein described. The following examples illustrate the use of ketones other than acetone in the process:

Example 7

Following the procedure described in Example 1, 3 liters of methylisobutylketone were cooled to 6° C. and reacted with 450 grams of finely-ground 96% potassium hydroxide while maintaining the said temperature. Thereafter 5.7 cubic feet of acetylene were absorbed in the mixture while continuously maintaining the said temperature and a pressure of 50 pounds per square inch, gauge. The reaction mixture was hydrolyzed with 1 liter of water; and the upper liquid layer of the thus-stratified mixture was acidified and fractionally distilled in the general manner described in Example 1. A combined yield of around 80% of methylisobutylethynylcarbinol, boiling at 147–148° C. under atmospheric pressure, and symmetrical dimethyldiisobutylbutynediole, melting at about 60° C. when crystallized from ligroin, was obtained, the yield of the carbinol being approximately five times that of the pinacol.

Example 8

Three liters of methylamylketone cooled to 6° C. were reacted with 450 grams of finely-ground 96% potassium hydroxide and 4.7 cubic feet of acetylene under the conditions described in Example 7. Upon fractional distillation of the upper layer of the mixture from the hydrolysis step a yield of approximately 88% of methylamylethynylcarbinol, and a yield of around 8% of symmetrical dimethyldiamylbutynediole were secured. The former boils between 88 and 90° C. under 30 mm. of mercury, absolute pressure. The glycol, upon crystallization from dichlordiethyl ether, melts at 82° C.

Example 9

Two hundred and three grams of dihydroisophorone, prepared by the hydrogenation of isophorone, were dissolved in two liters of dry ethyl ether, and the solution thereof was cooled to 6° C. and reacted with 84 grams of finely-divided 96% potassium hydroxide while maintaining the said temperature. 0.5 cubic foot of acetylene then was absorbed by the said solution, while maintaining the latter at the said temperature and under a pressure of 50 pounds per square inch, gauge. The reaction mixture was hydrolyzed by addition of 200 cc. of water. The upper liquid layer of the thus-stratified mixture was acidified and fractionally distilled in the general manner described in Example 1. Pure ethynyltrimethylcyclohexanol was secured as a fraction boiling between 91° and 93° C. under an absolute pressure of 15 mm. of mercury. This compound has a density at 23° C. of 0.9104, and an index of refraction at the same temperature of 1.4662. The compound was secured in a 67% yield, based upon acetylene reacted.

Practically all of the acetylene utilized in the present process appears in the form of either an acetylenic carbinol or an acetylenic glycol. Either of these types of compounds may be converted to the other. Thus upon heating acetylene pinacol (2,5-dimethyl-2,5-dihydroxyhexyne-3) to its boiling point at atmospheric pressure, it is converted to dimethylethynylcarbinol and acetone. The reaction proceeds best at temperatures around 180° to 200° C., but proceeds rapidly at temperatures as low as 100° C.

Solvents for the acetone obviously are not essential for the satisfactory operation of the process. In some instances the presence of the solvent reduces the efficiency of the process, while apparently increasing the yield of the acetylenic glycols.

It is not necessary to employ pure acetylene in treating the reaction mixture formed by reacting the ketone and alkali metal hydroxide. Under some conditions the acetylene advantageously may be diluted with a gas inert to the reactants—such as nitrogen. This greatly reduces the explosion hazard, particularly when conducting the acetylene treatment under the higher superatmospheric pressures.

It is evident that utilization of the present invention makes possible the production of acetylenic carbinols and 1,4-acetylenic glycols in satisfactory yields directly from acetylene and aliphatic ketones, using a reagent which may be regarded as functioning in the general manner of a reaction promoter or condensation catalyst—is completely recoverable for reuse in the process by simple evaporation of its aqueous solution—and is relatively inexpensive. It is not essential to employ anhydrous conditions during the condensation; and the presence of even 10% or more of water in the reaction mixture does not prevent the securing of acceptable yields of the desired acetylenic compounds. The conditions necessarily employed in the process are not extreme, and are readily attainable with simple equipment, requiring a minimum of supervision.

The invention is susceptible of modification within the scope of the appended claims.

I claim:

1. Process for producing an acetylenic alcohol which comprises the steps of reacting a saturated ketone with an alkali metal hydroxide in finely-divided solid form, and treating the resultant mixture with acetylene at a temperature inhibiting the production of unsaturated ketone-condensation products not convertible to acetylenic alcohols.

2. Process as defined in claim 1, wherein the alkali metal hydroxide is slowly added to the ketone while maintaining the reaction mixture at a temperature not substantially higher than around 15° C.

3. Process for producing a tertiary acetylenic alcohol of the class consisting of monohydric and polyhydric alcohols, which comprises reacting a saturated aliphatic ketone with an alkali metal hydroxide in solid form while maintaining the said mixture at a temperature not higher than around 10° C., thereafter reacting the resultant mixture with acetylene while maintaining the said mixture at a temperature not higher than around 10° C., and under a pressure from around atmospheric to around 100 pounds per square inch, hydrolyzing the salt of the acetylenic alcohol thus formed while stratifying the mixture into a plurality of layers, acidifying the layer containing the acetylenic alcohol, fractionally distilling the acidified layer under subatmospheric pressure, and separately recovering the tertiary acetylenic alcohol present therein.

4. Process for producing a tertiary acetylenic alcohol of the class consisting of monohydric and polyhydric alcohols, which comprises reacting a saturated aliphatic ketone with an alkali metal hydroxide while maintaining the mixture at a temperature not higher than around 15° C., thereafter absorbing acetylene in the said mixture while maintaining the latter at a temperature within the range from around −10° C. to around 10° C. and under a pressure of from around atmospheric to around 100 pounds per square inch, hydrolyzing the salt of the acetylenic alcohol thus produced while stratifying the mixture into layers, acidifying the uppermost layer, fractionally distilling the acidified layer under vacuum, and separately recovering the tertiary acetylenic alcohol present therein.

5. Process as defined in claim 4, wherein the said alkali metal hydroxide contains not more than around 10% of water.

6. The process as defined in claim 4, wherein potassium hydroxide containing 96% potassium hydroxide in finely divided solid form is the alkali metal hydroxide employed.

7. The process as defined in claim 4, wherein sodium hydroxide is the alkali metal hydroxide employed.

8. Process for producing a tertiary acetylenic alcohol of the class consisting of monohydric and polyhydric alcohols, which comprises reacting a saturated aliphatic ketone with an alkali metal hydroxide while maintaining the mixture at a temperature within the range from around −10° C. to around 10° C., thereafter absorbing acetylene in the said mixture while maintaining the latter at a temperature within the range from around −10° C. to around 10° C. and under a pressure within the range from around atmospheric to around 100 pounds per square inch, hydrolyzing the salt of the acetylenic alcohol thus produced while stratifying the mixture into layers, acidifying the uppermost layer, fractionally distilling the acidified layer under vacuum, and separately recovering the tertiary acetylenic alcohol present therein.

9. Process as defined in claim 8, wherein the acetylene absorption step is conducted under a pressure within the range from around 50 pounds to around 100 pounds per square inch.

10. Process as defined in claim 8, wherein the alkali metal hydroxide in finely-divided form is reacted with the ketone in the presence of a volatile solvent for the reactants.

11. Process for producing a tertiary acetylenic alcohol of the class consisting of monohydric and polyhydric alcohols, which comprises reacting a saturated aliphatic ketone with an alkali metal hydroxide in finely-divided solid form containing not more than around 10% of water, while maintaining the mixture at a temperature not higher than around 15° C., thereafter absorbing acetylene in the said mixture while maintaining the latter at a temperature within the range from around −10° C. to around 10° C. and under a pressure of from around atmospheric to around 100 pounds per square inch, hydrolyzing the salt of the acetylenic alcohol thus produced while stratifying the mixture into layers, acidifying the uppermost layer, fractionally distilling the acidified layer under vacuum, and separately recovering the tertiary acetylenic alcohol present therein.

12. Process for producing an acetylenic alcohol of the class consisting of monohydric and polyhydric alcohols, which comprises reacting a saturated aliphatic ketone and an alkali metal hydroxide in finely-divided solid form while maintaining the mixture at a temperature not higher than around 10° C., thereafter reacting the resultant mixture with acetylene while maintaining the said mixture at a temperature not higher than around 10° C., and under a pressure within the range from around atmospheric to around 100 pounds per square inch, hydrolyzing the salt of the acetylenic alcohol thus formed, stratifying the mixture into a plurality of liquid layers, acidifying the uppermost layer, fractionally distilling the latter under vacuum, separately recovering the tertiary acetylenic alcohol present therein, and isolating from another of the said liquid layers and recovering the alkali metal hydroxide present therein.

13. Process for producing an acetylenic alcohol of the class consisting of dimethylethynylcarbinol and symmetrical tetramethylbutynediole, which comprises reacting acetone and a finely-divided alkali metal hydroxide in solid form while maintaining the mixture at a temperature within the range from around −10° C. to around 15° C., reacting the resultant mixture with acetylene under a pressure within the range from atmospheric to around 100 pounds per square inch, while maintaining the temperature within the range from −10° C. to 10° C. until absorption of the acetylene is substantially complete, hydrolyzing the resultant reaction mixture, separating and acidifying the uppermost layer of the mixture thus stratified, distilling the acidified mixture under subatmospheric pressure, and separately recovering the acetylenic alcohol present therein.

14. Process for producing an acetylenic alcohol of the class consisting of dimethylethynylcarbinol and symmetrical tetramethylbutynediole, which comprises reacting acetone and solid finely-divided potassium hydroxide containing not more than 10% of water while maintaining the mixture at a temperature around 6° C., thereafter reacting the resultant mixture with acetylene while maintaining the said temperature under a pressure within the range from 50 to 100 pounds per square inch until absorption of the acetylene is complete, hydrolyzing the resultant reaction mixture with water, separating and acidifying the uppermost layer of the mixture thus stratified, distilling the acidified mixture under subatmospheric pressure, and separately recovering the acetylenic alcohol present therein.

15. As a chemical compound, ethynyltrimethylcyclohexanol, the same being a liquid boiling between 91° and 93° C. under an absolute pressure of 15 mm. of mercury, and having a density and index of refraction at 23° C. of 0.9104 and 1.4662 respectively.

16. As a chemical compound, symmetrical dimethyldiisobutylbutynediole, the same being a crystalline solid, soluble in ligroin, and melting at about 60° C.

17. Process for producing a tertiary monohydric acetylenic alcohol, which comprises reacting a saturated aliphatic ketone with an alkali metal hydroxide in finely-divided solid form and containing not more than around 10% of water, while maintaining the mixture at a temperature not higher than about 15° C., thereafter absorbing acetylene in the said mixture while maintaining the latter at a temperature within the range from around −10° C. to around 10° C. and under a pressure within the range from around atmospheric to around 100 pounds per square inch, hydrolyzing the salt of the polyhydric acetylenic alcohol thus produced while stratifying the mixture into layers, acidifying the uppermost layer, fractionally distilling the acidified layer under vacuum, separating the tertiary polyhydric acetylenic alcohol present therein, and heating the latter, thereby converting it to a tertiary monohydric acetylenic alcohol and a ketone, and recovering the said monohydric alcohol.

18. Process for producing a tertiary acetylenic alcohol, which comprises reacting a saturated aliphatic ketone with an alkali metal hydroxide in solid form while maintaining the said mixture at a temperature not higher than around 10° C., thereafter reacting the resultant mixture with acetylene while maintaining said mixture at a temperature not higher than around 10° C., and under a pressure ranging from around atmospheric to around 100 pounds per square inch, hydrolyzing the salt of the acetylenic alcohol thus formed, stratifying the resultant mixture into a plurality of layers, acidifying and drying the layer containing the acetylenic alcohol, fractionally distilling the acidified and dried layer under subatmospheric pressure, and separately recovering the tertiary acetylenic alcohol present therein.

THOMAS H. VAUGHN.